Aug. 17, 1937. W. J. BROWN 2,090,497
JOINT
Filed Aug. 3, 1936   2 Sheets-Sheet 1

WILLIAM JEFFRIES BROWN
INVENTOR

BY
ATTORNEY

Aug. 17, 1937.                W. J. BROWN                  2,090,497
                                 JOINT
                          Filed Aug. 3, 1936          2 Sheets-Sheet 2
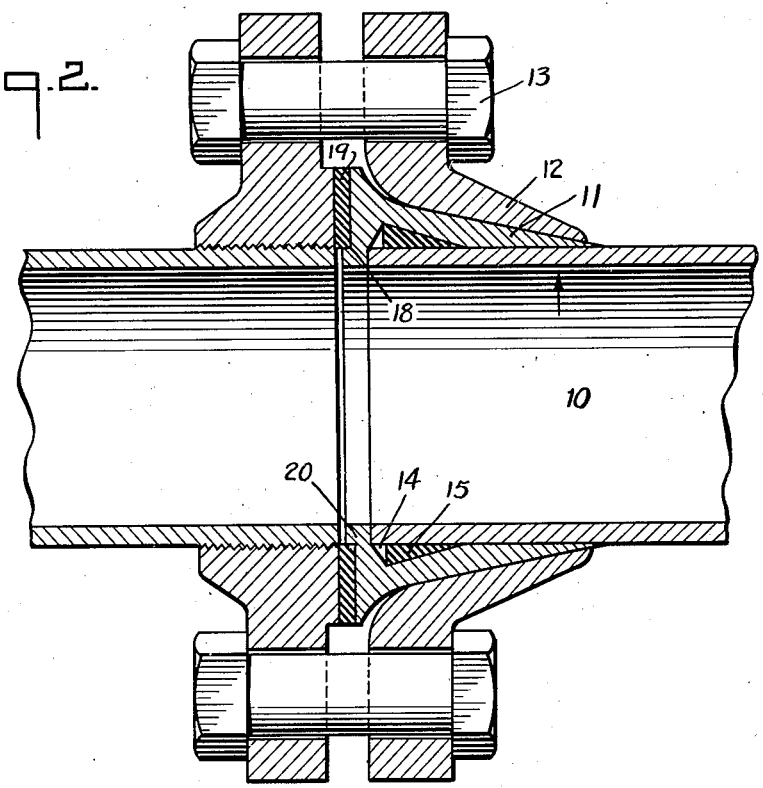
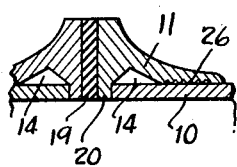
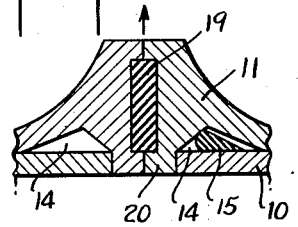
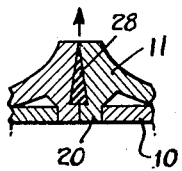
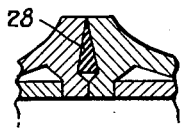
WILLIAM JEFFRIES BROWN
        INVENTOR
             ATTORNEY Patented Aug. 17, 1937

2,090,497

UNITED STATES PATENT OFFICE 2,090,497

JOINT

William Jeffries Brown, New York, N. Y., assignor of one-eighth to Ernest W. Borkland, Jr., and one-eighth to Tyree Dilliard, Jr., both of New York, N. Y.

Application August 3, 1936, Serial No. 93,942
In France October 23, 1935

8 Claims. (Cl. 285—137)

The present invention relates to joints used in the joining of pipes and particularly to that type of joint commonly known as a flange union.

Heretofore flanges either came manufactured integral with the pipe or were screwed, rolled, soldered or welded on the pipes. Flanges manufactured on the pipes invariably call for special lengths of pipe varying from the standard. In case the flanges are screwed, rolled, welded or otherwise fastened to the pipe length a separate operation is required which increases the cost of installation and causes in many cases an important delay in the time required to finish the work.

The object of the present invention is to eliminate these disadvantages and to produce a flange union which may be complete in itself or may be coupled with a pipe having an integral or standard flange.

A further object is to produce a low cost union that will give a strong tight joint and which may be used upon pipes without any preliminary preparation of the pipe to receive the joint or change it from its standard form, thus producing an economical assembly means.

My joint comprises an element adapted to be slipped over the pipe and be compressed against the pipe by a flanged compression element when two such assemblies are secured together.

In the preferred modification of my invention the compressed element consists of a collar of substantially plastic material which engages the outer cylindrical surface of the pipe. The exterior surface of this collar is substantially in the form of a truncated cone. A compression element preferably in the form of a flange is adapted to ride over the substantially truncated portion of the collar to compress this element into close contact with the outside cylindrical surface of the pipe. This permits the joining of the pipe carrying these two elements either together or to standard fittings now in common use.

The foregoing and other features of my invention will now be described in connection with the accompanying two sheets of drawings, forming part of this specification in which I have represented my joint in its preferred form, after which I shall point out more particularly in the claims those features which I believe to be new and of my own invention.

In the drawings:

Figure 2 is a longitudinal section through a pipe joint, one of the pipes supplied with a screw threaded flange and the other pipe supplied with my slip-on flange.

Figure 3:
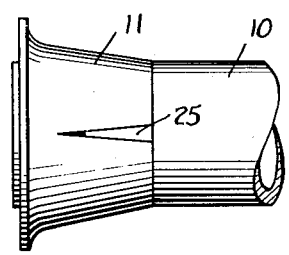
Figure 3 is a side elevation of my compressed element in position on a pipe.
Figure 4:
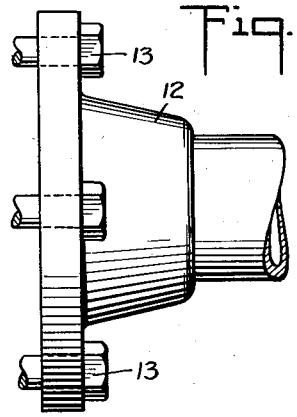
Figure 4 is a side elevation of a section of a pipe on which is mounted my flange which compresses the compressed element when the joint is assembled.

Figures 5 to 8 inclusive illustrate modifications in part of the joining of the collars. These views are all longitudinal sections through the compressed collars.

In carrying out my invention each piece of pipe 10 receives a collar 11 which is compressed against the outside of the pipe 10 by the collar or flange 12 when fastened by the bolts 13.

The collar 11 in absence of any compression fits loosely over the pipe and is provided with an annular cavity 14 of triangular cross section in which is closely fitted a washer or bushing or other packing 15. It will be observed that this washer or bushing is triangular in cross section and so positioned that an acute angle is provided to closely fit into the angle of the space 14 when pressure is exerted from within the pipe and also has a sharp acute angle to wedge into the opposite acute end of this triangular space 14 when there is a vacuum created within the pipe, thereby ensuring a tight joint whether or not pressure is exerted from within or without the pipe.

Figure 1:
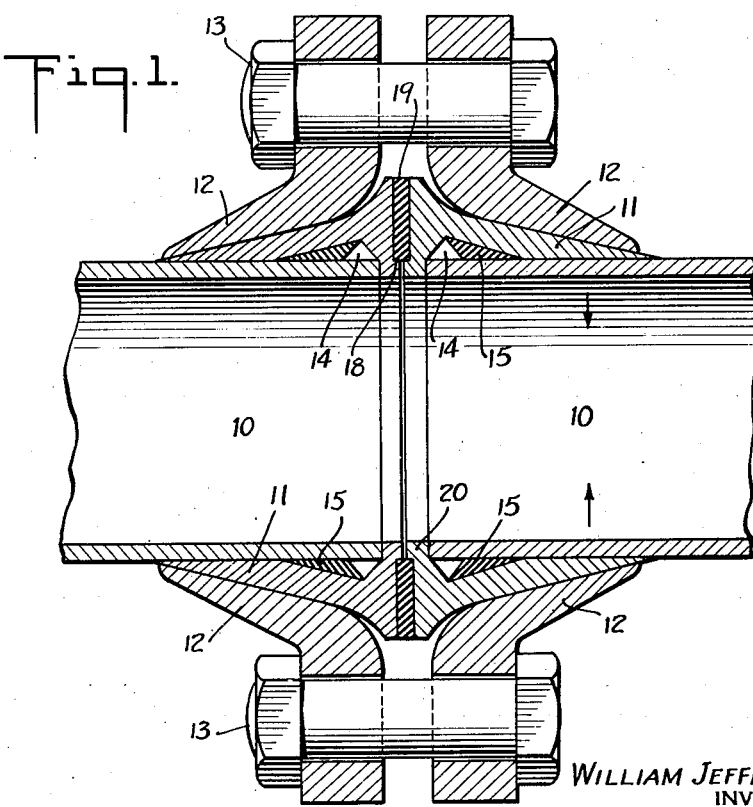
Figure 1 is a longitudinal section through my joint.

In Figure 6 the bushing 15 is shown in position of extreme vacuum, whereas in Figures 1 and 2 the bushing 15 is shown in position of internal pressure.

The collar 11 is also provided with a recess 18 to accommodate a compressible washer or gasket 19. The collar also has an interior flange 20 against which the end of the pipe 10 abuts.

In assembling the union the flange 12 or compression units are first pushed over the exterior of the pipes 10.

The bushings 15 are inserted in the angular cavity 14 in the collars and then the collars 11 are pushed on the pipe until the end of the pipe abuts against the interior flange 20 of the collar.

The ends of the two pipes are brought together after placing the bushing or gasket 19 in the space between the two collars 11 which are held in contact by the flanges 12 by means of the bolts 13.

The outside flanges 12 are then turned around the collars 11 so that the holes in the collars register and the bolts 13 are inserted. The tightening of the bolts determines the force applied by the flanges on the truncated pliable collars. These collars are compressed until they firmly grip the outside surface of the pipe. The amount of pressure that can be applied is very great as will be readily seen for the only contacts between the two collars and the two flanges are the inclined surfaces.

If my compressed collar 11 is constructed of a metal that is not plastic enough to conform and tightly grip the outside cylindrical surface of the pipe, I may provide a plurality of slots 25 in the conical flange to permit it more easily to conform to the cylindrical surface of the pipe ensuring a tight joint.

In Figure 5 I show a modified form of my collar 11 in that the inner surface of that portion which slides over the pipe is roughened as at 26 to better grip the pipe. I also show the gasket 19 extending to the inside of the joint and not held from extreme compression by the flanges 27.

In Figure 6 I show two sets of supporting flanges 27 exterior and interior of the gasket.

In Figures 7 and 8 I show a triangular gasket 28.

In general through this invention is realized a means of assembling pipe giving perfect joints and allowing great facility and speed when making the connections.

I wish it distinctly understood that my joint herein described and illustrated is in the form in which I desire to construct it and that changes or variations may be made as may be convenient or desirable without departing from the salient features of my invention and I therefore intend the following claims to cover such modifications as naturally fall within the lines of invention.

I claim:

1. A joint of the class described in combination, a compressible sleeve adapted to be compressed against the cylindrical outside of a pipe and having an internal annular recess forming with the wall of the pipe an enclosed annular hollow space and provided with a substantially conical outer surface, a packing ring within the hollow space, the cross section of the packing and the cross section of the space being such that any internal pressure within the pipe tends to force the packing against that portion of the hollow space remote from the end of the pipe, a flange adapted to ride upon the conical surface, and means to hold the compressed member tight against the pipe.

2. The device of claim 1 including an annular cavity in the compressible member adjacent to the pipe, a packing within the cavity, the cavity having an angular cross section decreasing in size in the direction in which internal pressure would force the packing into the decreasing angle between the compressed element and the surface of the pipe.

3. The device of claim 1 including an annular cavity in the compressible member adjacent the pipe, a packing within the cavity, the cross section of the cavity presenting an angular cross section decreasing in size in the direction in which external pressure would force the packing into the decreasing angle between the compressed element and the surface of the pipe.

4. The device of claim 1 including slots cut part way through the substantially conical portion of the compressible member.

5. A joint of the class described for joining two sections of pipe together, in combination, compressible members on each pipe adapted to be compressed against the outside surface of the pipe, packing means to pack the joint between the pipe and compressible members, flanges adapted to ride on and compress the compressed member, a gasket between the compressible members, means to secure the flanges together whereby the compressible members are compressed against the pipes and the ends compressed against the gasket.

6. The device of claim 5 including an annular cavity in the compressible member adjacent to the pipe, a packing within the cavity, the cavity having an angular cross section decreasing in size in the direction in which internal pressure would force the packing into the decreasing angle between the compressed element and the surface of the pipe.

7. The device of claim 5 including an annular cavity in the compressible member adjacent the pipe, a packing within the cavity, the cross section of the cavity presenting an angular cross section decreasing in size in the direction in which external pressure would force the packing into the decreasing angle between the compressed element and the surface of the pipe.

8. A joint of the class described for joining two sections of pipe together, in combination, compressible members on each pipe adapted to be compressed against the outside surface of the pipe, packing means to pack the joint between the pipe and compressible members, flanges adapted to ride on and compress the compressed member, a gasket between the compressible members, means to secure the flanges together whereby the compressible members are compressed against the pipes and the gaskets.

WILLIAM JEFFRIES BROWN.